United States Patent
MacDonald et al.

[11] 3,723,128
[45] Mar. 27, 1973

[54] PHOTOGRAPHIC MATERIAL CONTAINING FILTER DYES

[75] Inventors: Eric MacDonald, Llanbrynmair, Wales; Frederick Campbell, Manchester, both of England

[73] Assignee: Ilford Limited, Ilford, England

[22] Filed: June 2, 1971

[21] Appl. No.: 149,398

[30] Foreign Application Priority Data

June 3, 1970  Great Britain.....................26,841/70

[52] U.S. Cl...............................96/84 R, 260/240.2
[51] Int. Cl. ....................................G03c 1/84
[58] Field of Search .......................96/84 R

[56] References Cited

UNITED STATES PATENTS 2,611,696  9/1952  Keyes et al..........................96/84 R
2,533,472  12/1950  Keyes et al..........................96/84 R Primary Examiner—Ronald H. Smith
Attorney—Wenderoth, Lind & Ponack

[57] ABSTRACT

This invention relates to new polymethinoxanol dyestuffs. They correspond to the formula

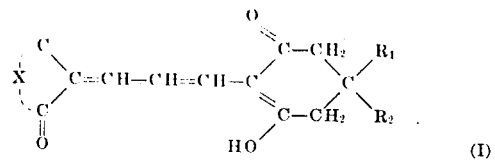

wherein X is the residue of a heterocyclic ring system and $R_1$ and $R_2$ are hydrogen atoms or optionally substituted alkyl or aryl groups. They are useful for incorporation in photographic silver halide material and able to correct various deficiencies of such material.

4 Claims, No Drawings

PHOTOGRAPHIC MATERIAL CONTAINING FILTER DYES

This invention relates to novel dyestuffs and to their use in photographic materials.

According to the present invention there is provided a dyestuff of the general formula I:

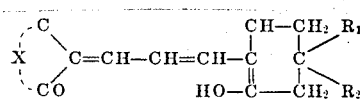

wherein X is the residue of a pyrazalone or indandione ring system which is further optionally substituted, $R_1$ is an alkyl group or a substituted alkyl group or a hydrogen atom and $R_2$ is a hydrogen atom, an alkyl group, a substituted alkyl group, an aryl group or a substituted aryl group.

According to another aspect of the present invention the dyestuffs of the above formula I are prepared by reacting a compound of formula II:

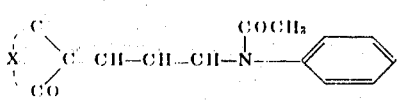

with a compound of formula III:

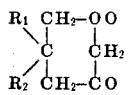

wherein X, $R_1$ and $R_2$ have the meanings assigned to them above, in an organic solvent medium and in the presence of a basic condensing agent.

According to another embodiment of the present invention, dyestuffs of the above formula I are prepared by reacting a compound of formula IV:

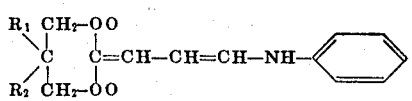

with a compound of formula V:

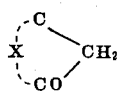

wherein X, $R_1$ and $R_2$ have the meanings assigned to them above, in an organic solvent in the presence of a basic condensing agent.

The dyestuffs of the present invention are of use as filter dyes in photographic silver halide materials and according to another aspect of the present invention there is provided photographic silver halide material which comprises a support having coated thereon at least one silver halide emulsion layer there being present in at least one layer of the photographic material at least one dyestuff of the above formula I.

The use of dyes in gelatin layers (or other polymeric layers) or gelatino silver halide emulsion layers of photographic materials is well known to correct for various inherent deficiencies of photographic material. Such deficiencies are for example:

a. the U.V. sensitivity of most silver halide layers (which however can be corrected by the U.V. absorbing filters on the camera lens), b. in conventional order multilayer color camera material, the blue sensitivity of the green and red sensitive layers, c. progressive scatter of light by the silver halide grains leading to unsharpness (loss of acutance), d. reflection of light at the emulsion-base, base-air interfaces (halation), e. multilayer color material out of speed balance, f. non-ideal spectral sensitivity.

Such dyes may be called filter, antihalation, screening, layer balancing or acutance dyes, depending on their function. They all act by absorbing light to which a particular silver halide emulsion is sensitive, and they can be multifunctional. Dyes of this type may be divided into two classes:

1. those which are non-diffusible and which therefore may be located in a particular layer or silver halide emulsion layer or layers, 2. those which are freely diffusible.

Whatever the function of the dye or its class, it must satisfy the following requirements:

a. the dye must have the correct selective spectral absorption for the function to be performed, b. the dyes must be photographically inert, i.e., have no chemical desensitizing or fogging action, c. in the case of photographic material for viewing as a transparency, the dye must be completely removable at some stage in the processing procedure. The removal can be by destruction of the color chromophore of a non-diffusible dye, or by washing out of a soluble diffusible dye which preferably is accompanied by decolorization, otherwise baths can become undesirably colored.

The dyes of the present invention have been found to be of use in correcting a number of the inherent deficiencies of silver halide photographic material as hereinbefore set forth. They are all of class 1 gelatin substantive type and satisfy the requirements (a), (b) and (c) as hereinbefore set forth. They have little or no effect on the sensitivity of green and red sensitized layers over and above the decrease expected by absorption of light to which the layers are sensitive. They have no fogging effect on silver halide emulsions. Although substantive to the photographic layer in which they are coated, they are rapidly removed and permanently decolorized by the sodium sulphite present in most photographic developers.

The following preparations will serve to illustrate the preparations of some of the intermediates used in the Examples which follow.

1-Phenyl-3-methyl-4-γ-acetanilidoallylidene-5-pyrazolone

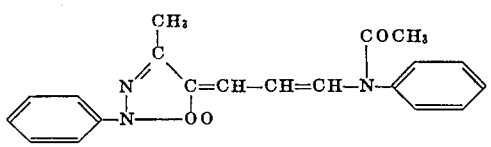

17.4 parts of 1-phenyl-3-methyl-5-pyrazalone and 25.85 parts of β-anilinoacrolein anil hydrochloride, were mixed in 100 parts of acetic anhydride and 10.1 parts of triethylamine cautiously added with stirring. The solution so obtained was refluxed for 30 minutes and cooled. The crystalline solid collected by filtration was washed with ether and recrystallized from toluene. 18.3 parts of the orange-red crystalline solid m.p. 218°–220° were obtained.

1-p-Anisoyl-3-methyl-4-γ-acetanilidoallylidene-5-pyrazolone

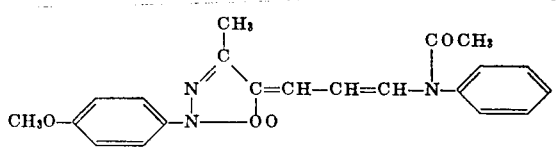

Replacing 17.4 parts of 1-phenyl-3-methyl-5-pyrazolone by 20.4 parts of 1-p-anisoyl-3-methyl-5-pyrazolone in the above preparation, 14.8 parts of a crystalline solid m.p. 154° were obtained.

1-p-Tolyl-3-methyl-4-γ-acetanilido-allylidene-5-pyrazolone

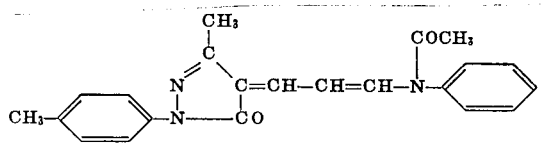

Replacing 17.4 parts of 1-phenyl-3-methyl-5-pyrazolone by 18.8 parts of 1-p-tolyl-3-methyl-5-pyrazolone, 16.8 parts of a crystalline solid m.p. 202°–4° were obtained.

2-γ-acetanilidoallylidene-1:3-indandione

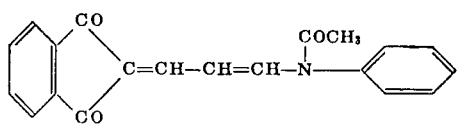

30 parts of indandione, 51 parts of β-anilinoacrolein anil hydrochloride, 18.0 parts of anhydrous potassium acetate and 300 parts of acetic anhydride were refluxed for 15 minutes and cooled. The product was collected by filtration and washed with water, methanol and finally ether. 57.5 parts of a yellow crystalline solid m.p. 242°–3° analyzed as follows:

Found : C 75.3%; H 4.8%; N 15.5%. $C_{20}H_{15}NO_3$ requires C 75.7%; H 4.7: N 15.2%.

5-Phenyldihydroresorcinol (or 5-phenylcyclohexane-1:3-dione)

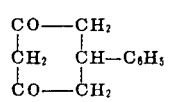

Prepared by the condensation of benzylidene acetone with sodiodiethyl malonate followed by alkaline hydrolysis. Colorless crystals m.p. 180° (dec.).

5-p-Anisoylcyclohexane-1:3-dione

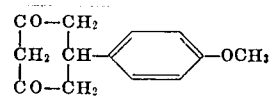

Prepared by the condensation of p-anislyidene acetone with sodiodiethyl malonate followed by alkaline hydrolysis. Colorless crystalls m.p. 176°.

2-γ-anilidoallylidene-5:5-dimethylcyclohexane-1:3-dione

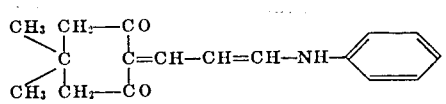

11.2 parts of dimedone and 11.4 parts of β-anilinoacrolein anil hydrochloride were dissolved in 200 parts of hot ethanol and 20 parts of triethylamine then refluxed for 15 minutes during which time the crystalline product separated. This was collected by filtration. Recrystallization from ethanol yielded 6.8 parts of a yellow crystalline solid m.p. 207° which analyzed as follows:

Found : C 75.6%; H 6.4%; N 5.0%. $C_{17}H_{19}O_2N$ requires C 75.8%; H 7.1%; N 5.2%.

In Examples 1–3 which follow, dyestuffs of the following general formula were prepared:

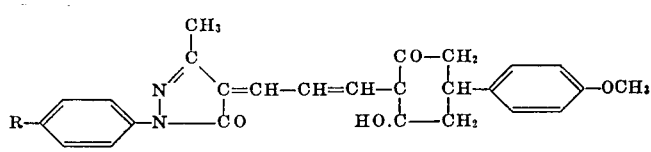

The value of R is indicated in each specific Example. The following Examples will serve to illustrate the invention.

EXAMPLE 1

[1-phenyl-3-methyl-5-pyrazolone-(4)]-[5-p-anisoyl-cyclohexane-1:3-dione-(2)]trimethinoxonol. (R = H)

27.6 parts of 1-phenyl-3-methyl-4-γ-acetanilidoallylidene-5-pyrazolone, 17.5 parts of 5-p-anisoylcyclohexane-1:3-dione were refluxed for 2 hours in 800 parts of ethanol and 80 parts of triethylamine. The solution so obtained was poured into excess of cold water and hydrochloric acid. 31.3 parts of a brownish solid was collected by filtration m.p. 208°–210°. A sample recrystallized from dimethyl formamide analyzed as follows:

Found : C 73.2%; H 5.4%; N 6.6%. $C_{26}H_{23}N_2O_4$ requires C 73.1%; H 5.4%; N 6.5%.

EXAMPLE 2

[1-p-anisoyl-3-methyl-5-pyrazolone-(4)]-[5-p-anisoyl-cyclohexane-1:3-dione-(2)]trimetyinoxonol. (R = —OCH$_3$)

14.8 parts of 1-p-anisoyl-3-methyl-4-γ-acetanilidoallylidene-5-pyrazolone, 17.2 parts of 5-p-anisoyl-cycohexane-1:3-dione were refluxed for 2 hours in 400 parts of ethanol and 40 parts of triethylamine. The solution so obtained was poured into excess of cold water and hydrochloric acid. 15.8 parts of a brownish solid was collected by filtration. A sample recrystallized from butanol had a melting point of 220° and analyzed as follows:

Found : C 69.4%; H 5.8%; N 6.0%. $C_{27}H_{28}N_2O_5$ requires C 70.7%; N 5.67%; N 6.1%.

EXAMPLE 3

[1-p-tolyl-3-methyl-5-pyrazolone-(4)]-[5-p-anisoyl-cyclohexane-1:3-dione-(2)]trimethinoxonol (R = —CH$_3$)

Replacing the substituted pyrazolone in the Examples 1 and 2 with 14.4 parts of 1-p-tolyl-3-methyl-4-γ-acetanilido allylidene-5-pyrazolone, 15.4 parts of the above product, m.p. 216°, were obtained.

EXAMPLE 4

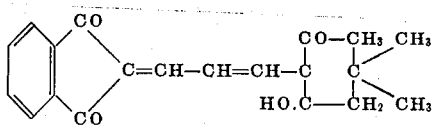

[1:3-indandione-(2)]-[5:5-dimethylcyclohexane-1:3-dione-(2)]trimethinoxonol

This was made in two ways:

1. 3.2 parts of 2-γ-acetanilidoalkylidene-1:3-indandione, 1.9 parts of dimedone, 20 parts of pyridine and 1.5 parts of triethylamine were heated for 1 hour on the steam bath, cooled and poured into an excess of water and hydrochloric acid. The product was collected by filtration and well washed with water (3.1 parts). On recrystallization from butanol the product melted at 240°.

2. 2.7 parts of 2-γ-anilidoallylidene-5:5-dimethyl-1:3-dione, 1.46 parts of indandione, 20 parts of pyridine and 1.5 parts of triethylamine were heated for one hour on the steam bath, cooled and poured into an excess of water and hydrochloric acid. The product was collected by filtration and well washed with water (3.3 parts). On recrystallization from butanol product melted at 240°.

EXAMPLE 5

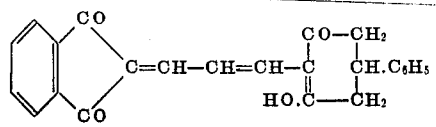

[1:3-indandione-(2)]-[5-phenylcyclohexane-1:3-dione-(2)]-trimethinoxonol 34.1 parts of 2-γ-acetanilidoallylidene-1:3-indandione and 21 parts of 5-phenyl-cyclohexane-1:3-dione were heated in 250 parts of pyridine until dissolved and 14 parts of triethylamine added. After refluxing for 1 hour the solution was cooled and drowned into an excess of water and hydrochloric acid. The solid collect by filtration, 46 parts, was heated with butanol and refiltered hot and washed with petrol ether to give a crystalline product m.p. 238°–242° which analyzed as follows:

Found : C 78.4%; H 5.3%; Required : C 77.8%; H 4.9%.

EXAMPLE 6

Incorporation in Gelatin Filter Layer

The dyestuffs of the Examples were incorporated in photographic material in the following manner:

2 parts of the dye were dissolved by warming in 100 parts of methanol containing 10 parts of 2N sodium carbonate solution. The solution was added with stirring to a solution at 40° of 400 parts of 10 percent gelatin solution, 175 parts of water and 10 parts of 4 percent methanolic solution of the dioctyl ester of sodium sulfosuccinic acid, and the pH reduced to 6.3 with a normal solution of acetic acid. The gelatin layer was coated by conventional means as a photographic filter layer between two gelatino emulsion layers in photographic multilayer material. The dyes of the Examples exhibited the following spectral characteristics in the filter layer.

| Example | Absorption Maximum (mμ) |
|---|---|
| 1 | 518 |
| 2 | 515 |
| 3 | 515 |
| 4 | 530 |
| 5 | 535 |

Filter layers as prepared above when supercoated with another gel layer show by cross sectional examination no diffusion into the supercoat. When processed they are completely and irreversibly discharged by developers which contain sodium sulphite.

We claim:

1. Photographic silver halide material which comprises a support having coated thereon at least one silver halide emulsion layer there being present in at least one layer of the photographic material at least one polymethinoxanol dyestuff of the formula

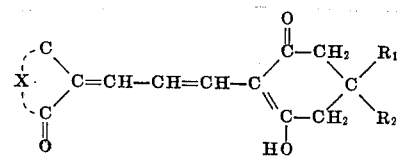

wherein X is the residue of a pyrazolone or indanedione ring system, R$_1$ is an alkyl group or a hydrogen atom, R$_2$ is a hydrogen atom, an alkyl group or an aryl group.

2. Photographic material as claimed in claim 1, which contains a polymethinoxanol dyestuff of the formula

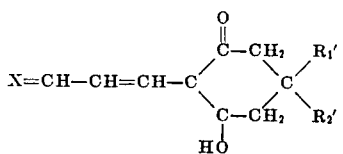

wherein X represents a radical selected from the group consisting of the heterocyclic radicals of the formulas

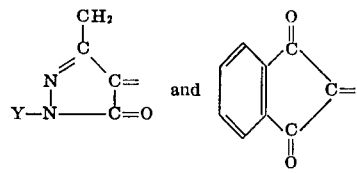

Y denoting a benzene radical, $R_1'$ represents a member selected from the group consisting of a hydrogen atom and a lower alkyl group, and $R_2'$ represents a member selected from the group consisting of a hydrogen atom, a lower alkyl group and a benzene radical.

3. Photographic material as claimed in claim 1 which contains a polymethinoxanol dyestuff of the formula

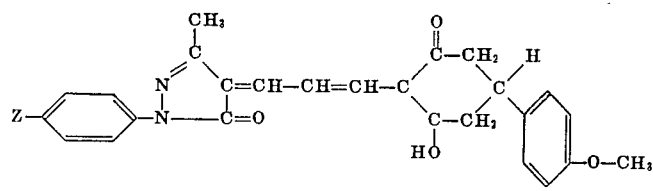

wherein Z represents a member selected from the group consisting of a hydrogen atom, a methyl group and a methoxy group.

4. Photographic material as claimed in claim 1 which contains a polymethinoxanol dyestuff of the formula

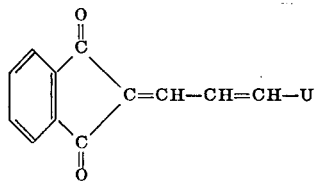

wherein U represents a member selected from the group consisting of the radicals corresponding to the formulas

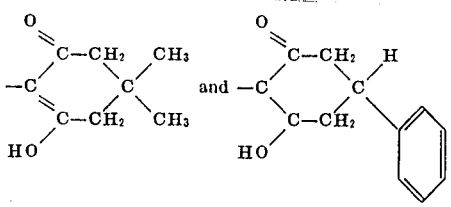

* * * * *